United States Patent
Han et al.

(10) Patent No.: US 8,816,584 B2
(45) Date of Patent: Aug. 26, 2014

(54) LIGHT SOURCE APPARATUS

(71) Applicant: Electronics and Telecommunications Research Institute, Daejeon (KR)

(72) Inventors: Jun-Han Han, Daejeon (KR); Jeong Ik Lee, Gyeonggi-do (KR); Yong Hae Kim, Daejeon (KR); Myung Lae Lee, Daejeon (KR); Sang Hoon Cheon, Daejeon (KR); Jaehyun Moon, Daejeon (KR); Seung Koo Park, Daejeon (KR); Doo-Hee Cho, Daejeon (KR); Joo Hyun Hwang, Seoul (KR); Jin Wook Shin, Incheon (KR); Chul Woong Joo, Seoul (KR); Jin Woo Huh, Daejeon (KR); Hye Yong Chu, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 0 days.

(21) Appl. No.: 13/736,141

(22) Filed: Jan. 8, 2013

(65) Prior Publication Data

US 2013/0187542 A1    Jul. 25, 2013

(30) Foreign Application Priority Data

Jan. 25, 2012    (KR) .......................... 10-2012-0007283

(51) Int. Cl.
*H01Q 1/22* (2006.01)
(52) U.S. Cl.
USPC ............................................. 315/34; 315/32

(58) Field of Classification Search
CPC .................................................... H05B 33/0896
USPC ....................... 315/34; 313/504; 257/78–103
See application file for complete search history.

(56) References Cited

U.S. PATENT DOCUMENTS

| | | | |
|---|---|---|---|
| 7,909,483 B2 | 3/2011 | Jacobs et al. | |
| 2008/0136321 A1* | 6/2008 | Do et al. | 313/504 |
| 2009/0142984 A1* | 6/2009 | Logunov et al. | 445/25 |
| 2009/0290332 A1* | 11/2009 | Jacobs et al. | 362/183 |
| 2010/0026204 A1* | 2/2010 | Hente et al. | 315/291 |
| 2010/0181904 A1* | 7/2010 | Yoshizaki et al. | 313/504 |

FOREIGN PATENT DOCUMENTS

| | | | |
|---|---|---|---|
| JP | 07-231586 A | | 8/1995 |
| KR | 10-2004-0019566 A | | 3/2004 |
| KR | 10-2009-0019309 A | | 2/2009 |
| KR | 10-2004-0019566 | * | 7/2011 |
| KR | 10-1052254 | | 7/2011 |

* cited by examiner

*Primary Examiner* — Douglas W Owens
*Assistant Examiner* — Jonathan Cooper
(74) *Attorney, Agent, or Firm* — Rabin & Berdo, P.C.

(57) ABSTRACT

Provided is a light source apparatus which include a light emitting unit including a light emitting area of unit of surface, an antenna disposed along the outer periphery so as not to encroach on a light emitting area and a driving unit, and a driving unit processing wireless power received from the antenna and supplying the processed wireless power to the light emitting unit. According to the light source apparatus, miniaturization may be accomplished and a shielding phenomenon of an antenna reception signal caused by the light emitting area may be suppressed.

8 Claims, 6 Drawing Sheets

LIGHT SOURCE APPARATUS

CROSS-REFERENCE TO RELATED APPLICATIONS

This US non-provisional patent application claims priority under 35 USC §119 to Korean Patent Application No. 10-2012-0007283, filed on Jan. 25, 2012, the entirety of which is hereby incorporated by reference.

BACKGROUND OF THE INVENTION

The present general inventive concept relates to light source apparatuses and, more particularly, to a light source apparatus driven by wireless power supply.

A light source apparatus is a light emitting apparatus and is used in lighting equipment and backlight of display devices.

A light source apparatus requires a driving power to emit light. The driving power is supplied to the light source apparatus via a wire. Due to the connection of the wire, a size of the light source apparatus increases and a mounting space of the light source apparatus is restricted.

In Korean Patent Publication No. 10-2004-0019566, there is provided a technology for relieving restrictions in size and thickness of a light source apparatus, which result from size and thickness of a transformer, by replacing a high-capacity transformer with a plurality of low-capacity transformers and driving the low-capacity transformers with the same input voltage. However, even in this case, wire connection is used to restrict a space where a light source apparatus may be mounted.

PRIOR ART DOCUMENTS

Patent Document: Korean Patent Publication No. 10-2004-0019566

SUMMARY OF THE INVENTION

Embodiments of the inventive concept provide a light source apparatus driven by a wireless power.

According to an aspect of the inventive concept, a light source apparatus may include a light emitting unit including a light emitting area of unit of surface, an antenna disposed along the outer periphery of the light emitting area not to encroach on the light emitting area, and a driving unit processing wireless power received from the antenna and supplying the processed wireless power to the light emitting unit.

In an example embodiment, the light emitting unit may include an organic light emitting diode (OLED) where a transparent substrate, an anode layer, an organic thin film, and a cathode layer are sequentially stacked. The cathode layer may include a first cathode layer disposed at the same level as the anode layer and electrically separated from the anode layer, a second cathode layer stacked on the organic thin film and protruding to the side of the first cathode layer from the organic thin film, and a third cathode layer disposed between the protruding portion of the second cathode layer and first cathode layer to electrically connect the first and second cathode layers to each other.

In an example embodiment, an insulating layer may be provided between the anode layer and the first cathode layer.

In an example embodiment, the light source apparatus may further include a housing provided to cover the anode layer, the organic thin film, and the cathode layer. At least a portion of ends of the anode layer and the first cathode layer may be disposed to intersect a bonding surface of the housing. The driving unit may be connected to an outer portion intersecting the bonding surface of the housing at the anode layer and the first cathode layer.

In an example embodiment, at least a portion of the antenna is disposed on the outer portion when viewed from the top.

In an example embodiment, the antenna may form a closed loop including the light emitting area thereinside. The antenna may be disposed such that a portion of an inner space formed at the inner periphery of the closed loop is not concealed by the light emitting unit when viewed from the top.

In an example embodiment, a portion of the outer periphery of the antenna may form a closed loop along the outer periphery of the light emitting area within the range where at least a portion of an inner space formed at the inner periphery of the antenna is not concealed by the light emitting unit.

In an example embodiment, the antenna may be one or both of a micro strip antenna and a coil.

In an example embodiment, the driving unit may be stacked on the light emitting unit.

In an example embodiment, the light source apparatus may further comprise a ferrite layer between the driving unit and the light emitting unit.

BRIEF DESCRIPTION OF THE DRAWINGS

The inventive concept will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the inventive concept.

DETAILED DESCRIPTION

A light source device according to the inventive concept will now be described more fully hereinafter with reference to accompanying drawings.

Figure 1:
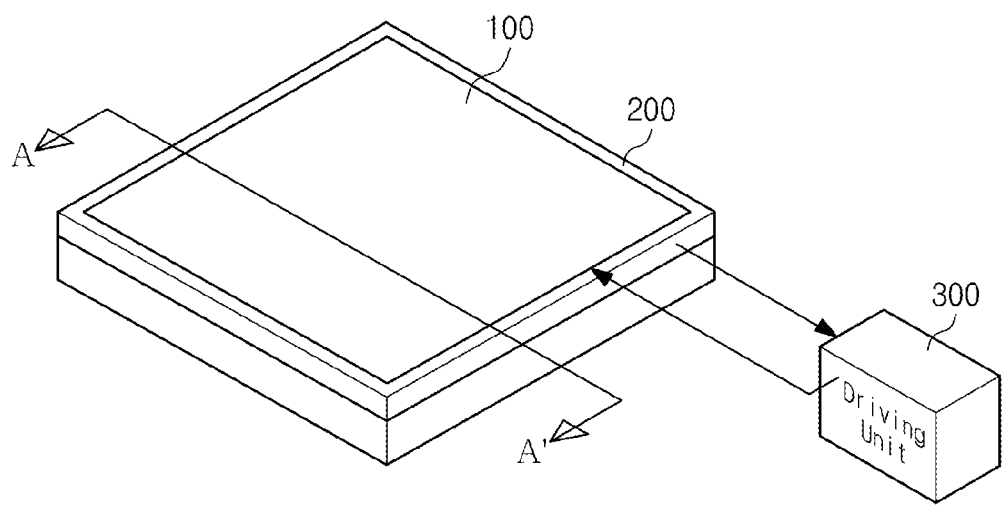
FIG. 1 is a block diagram of a light source apparatus according to an embodiment of the inventive concept.

FIG. 1 is a block diagram of a light source device according to an embodiment of the inventive concept. The light source device includes a light emitting unit 100 including a light emitting area of unit of surface, an antenna 200 disposed along the outer periphery of the light emitting area to prevent encroachment on the light emitting area, and a driving unit 300 processing wireless power received from the antenna 200 and driving the processed wireless power to the light emitting unit 100.

The light emitting unit 100 includes a light emitting area of unit of surface. The light emitting area of unit of surface may be formed as a surface light area of an organic light emitting diode (OLED) or a point light source of a plurality of light emitting diodes (LEDs) provided on a plane. In FIG. 1, the light emitting area is formed on a back surface. Thus, light is emitted in an arrow direction, i.e., downwardly.

The light emitting unit 100 may include an OLED. The configuration of the light emitting unit 100 including an OLED is shown in FIG. 2.

Figure 2:
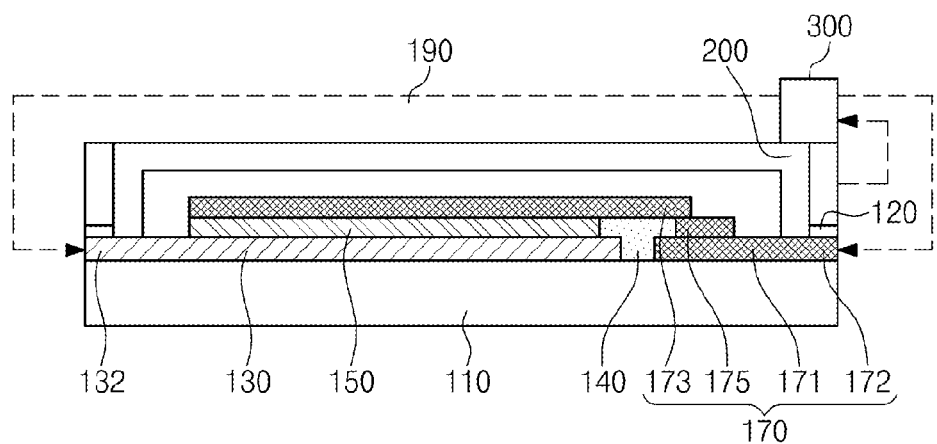
FIG. 2 is a cross-sectional view of a light source device according to an embodiment of the inventive concept.

FIG. 2 is a cross-sectional view taken along the line A-A' in FIG. 1.

Referring to FIG. 2, the light emitting unit 100 includes a transparent substrate 110, an anode layer 130, an organic thin film 150, and a cathode layer 170 which are sequentially stacked. Power is necessarily supplied to the anode layer 130 and the cathode layer 170. The cathode layer 170 may have the configuration to prepare a terminal for supplying the power, which will be described below.

The cathode layer 170 includes a first cathode layer 171 disposed at the same level as the anode layer 130 and electrically separated from the anode layer 130, a second cathode layer 173 stacked on the organic thin film 150 and protruding to the first cathode layer 171 from the organic thin film 150, and a third cathode layer 175 disposed between the protruding portion of the second cathode layer 173 and first cathode layer 171 to electrically connect the first and second cathode layers 171 and 173 to each other.

An insulating layer 140 may be disposed between the anode layer 130 and the first cathode layer 171 to provide electrical separation therebetween. In addition, the insulating layer 140 may also be disposed between the anode layer 130 and the third cathode layer 175.

The anode layer 130 may be made of a transparent anode material such as, for example, indium tin oxide (ITO).

The organic thin film 150 may be interposed, for example, between the anode layer 130 and the cathode layer 170 to a thickness ranging from about 100 nanometers to about 200 nanometers. The organic thin film 150 may have a structure in which a hole injection layer, a hole transfer layer, an emission material layer, an electron transfer layer, and an electron injection layer are sequentially stacked from the side of the anode layer 130.

A hole injected from the anode layer 130 and an electron injected from the cathode 170 reach the emission material layer through their respective transfer layers. The hole and electron reaching the emission material layer are combined with each other to generate an exciton. The exciton acts as a source for light emission. In this case, light of desired wavelength is generated by selectively adjusting an energy band gap of the exciton. The generated light is emitted through the anode layer 130 made of a transparent material and the transparent substrate 110.

In order to protect the anode layer 130, the organic thin film 150, and the cathode layer 170, they may be covered with a housing 190. In this case, at least one portion of the ends of the anode layer 130 and the first cathode 171 may be disposed to intersect a bonding surface of the housing 190. That is, after covering the housing 190, portions of the respective ends of the anode layer 130 and the first cathode layer 171 are exposed to the outside. If the portions exposed to the outside, i.e., the portions intersecting the bonding surface of the housing 190 are referred to as outer portions 132 and 172, a driving unit 300 is electrically connected to the outer portions 132 and 172.

Likewise, the outer portions 132 and 172 allow the driving unit 300 to be easily connected to respective electrode layer. Since portions of the ends of the anode layer 130 and the first cathode layer 171 intersect the bonding surface of the housing 190, the housing 190 is bonded to the anode layer 130 and the first cathode layer 171. According to a structure in which the respective electrodes are connected to the driving unit 300 and a stacked structure of the respective electrodes, the housing 190 may be directly bonded to the transparent substrate 110.

In the light emitting unit 100, a portion covered with the housing 190 is a light emitting area. Specifically, the light emitting area is an area in which the inner periphery of a bonding surface bonded to the light emitting unit 100 is formed at the housing 190 after bonding of the housing 190.

The antenna 200 wirelessly receives power and supplies the received power to the driving unit 300. The antenna 200 is disposed along the outer periphery of the light emitting area within the range that does not encroach on the light emitting area. Thus, wireless power is prevented from being shielded by the light emitting unit 100.

For example, in the case where the outer portions 132 and 172 are formed at the anode layer 130 and the first cathode layer 171, at least one portion of the antenna 200 is formed on the outer portions 132 and 172. In this case, an insulating layer 120 is interposed between the outer portions 132 and 172 and the antenna 200. In addition, the antenna 200 is in face-to-face contact with a side surface of the housing 190.

The antenna 200 may be configured to form a closed loop. Among wireless power methods, a magnetic induction method and a magnetic resonance method require a coil which forms a closed loop. Accordingly, when the antenna 200 is formed with a closed loop, various wireless power transfer methods may be applied. In this case, the antenna 200 forms a closed loop including a light emitting area therewithin. The light emitting area is included within the closed loop formed by the antenna 200 to minimize increase in volume or thickness which is caused by the antenna 200. In addition, the antenna 200 is disposed not at an upper or lower portion of the light emitting area but at a side surface of the light emitting area to alleviate a shielding phenomenon of wireless power which is caused by the light emitting area. That is, the antenna 200 and the housing 190 do not overlap in a plan view (i.e. a top view) of the light source apparatus, as FIGS. 2 and 3 indicate.

When an inner space of the closed loop is open to the light emitting area when viewed from the top, a shielding phenomenon may be effectively alleviated. However, in the above case, the antenna 200 is disposed on the outer portions 132 and 172 and thus a shielding phenomenon caused by the outer portions 132 and 172 may occur.

Figure 3:
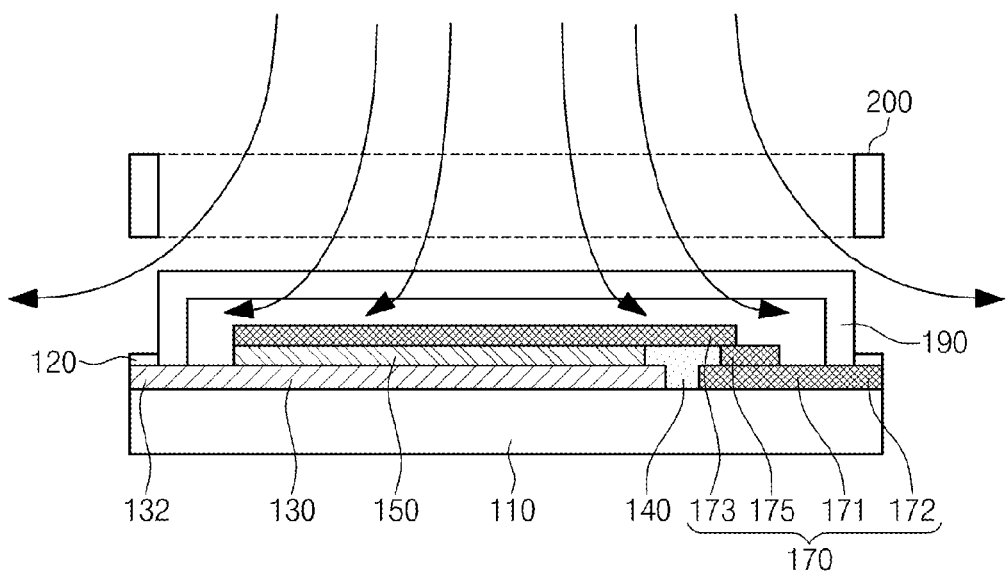
FIG. 3 is a schematic diagram illustrating a shielding phenomenon caused by a light emitting unit.

FIG. 3 illustrates a state in which the antenna 200 cannot reliably receive wireless power due to a shielding phenomenon caused by the light emitting area 100. However, it will be understood that the wireless power is normally received through a gap between each outer portion and the antenna 200.

In order to minimize the shielding phenomenon, the antenna 200 may extend such that a portion of an inner space formed at the inner periphery of a closed loop is not concealed by the light emitting unit 100 when viewed from the top.

Figure 4:
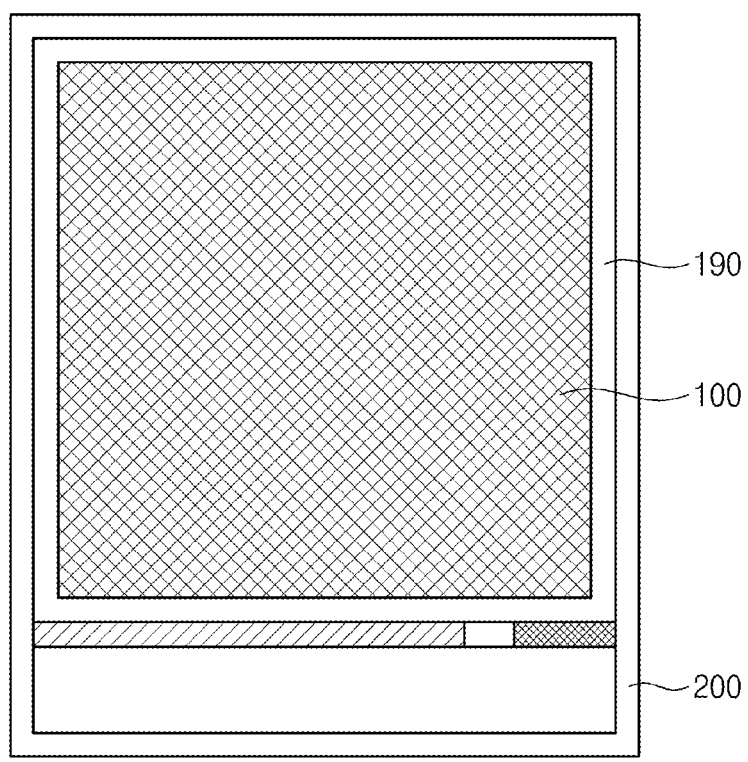
FIG. 4 is a schematic diagram of a light source device according to another embodiment of the inventive concept.

FIG. 4 is a schematic diagram (and a plan view) of a light source apparatus according to another embodiment of the inventive concept. Referring to FIG. 4, an antenna 200 is in face-to-face contact with a housing 190. In addition, a lower portion of the antenna 200 extends outwardly to be open and thus a portion of the inner space of a closed loop is open to a light emitting unit 100. That is, the portion of the inner space is not concealed by the light emitting unit 100. Accordingly, power is normally received through the unconcealed portion of the inner space of the curved line where the antenna 200 is disposed.

Figure 5:
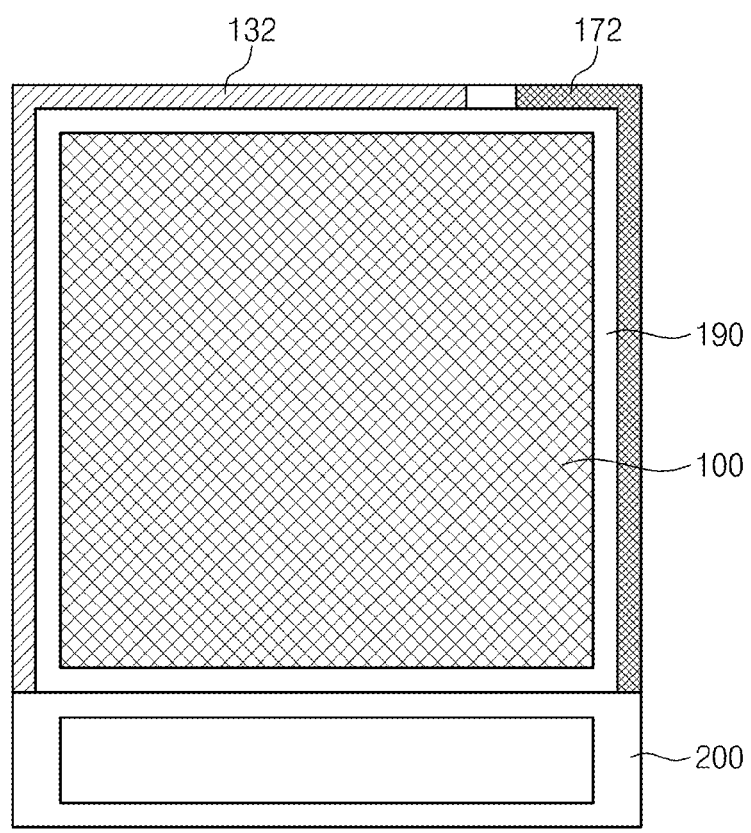
FIG. 5 is a schematic diagram of a light source device according to another embodiment of the inventive concept.

FIG. 5 is a schematic diagram of a light source apparatus according to another embodiment of the inventive concept.

In the light source apparatus shown in FIG. 5, a portion of the outer periphery of an antenna 200 forms a closed loop along the outer periphery of a light emitting area. At least a portion of the inner space formed at the inner periphery of the closed loop is formed not to be concealed by a light emitting unit 100 when viewed from the top.

In FIG. 5, the outer periphery of a closed looped is bonded to the entire one side of the light emitting unit 100 and the closed loop is formed in an outer direction facing the side of the light emitting unit 100. In addition, the entire inner space formed at the inner periphery of the closed loop is open to the light emitting unit 100 when viewed from the top. According to the configuration, it could be experimentally confirmed that a shielding phenomenon rarely occurs.

Figure 6:
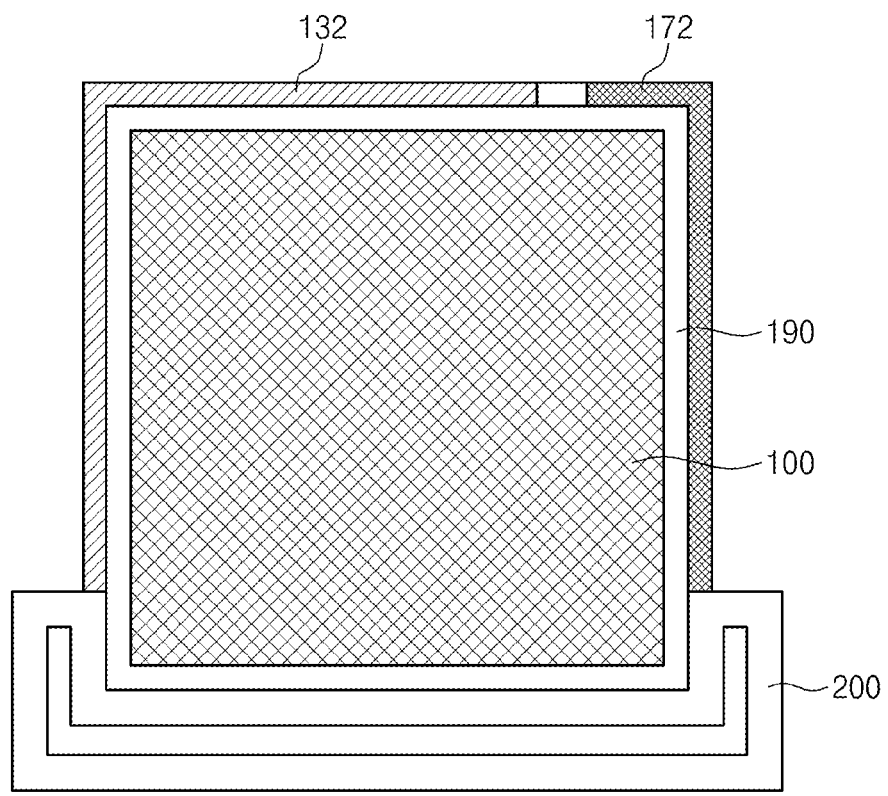
FIG. 6 is a schematic diagram of a light source device according to another embodiment of the inventive concept.
Figure 7:
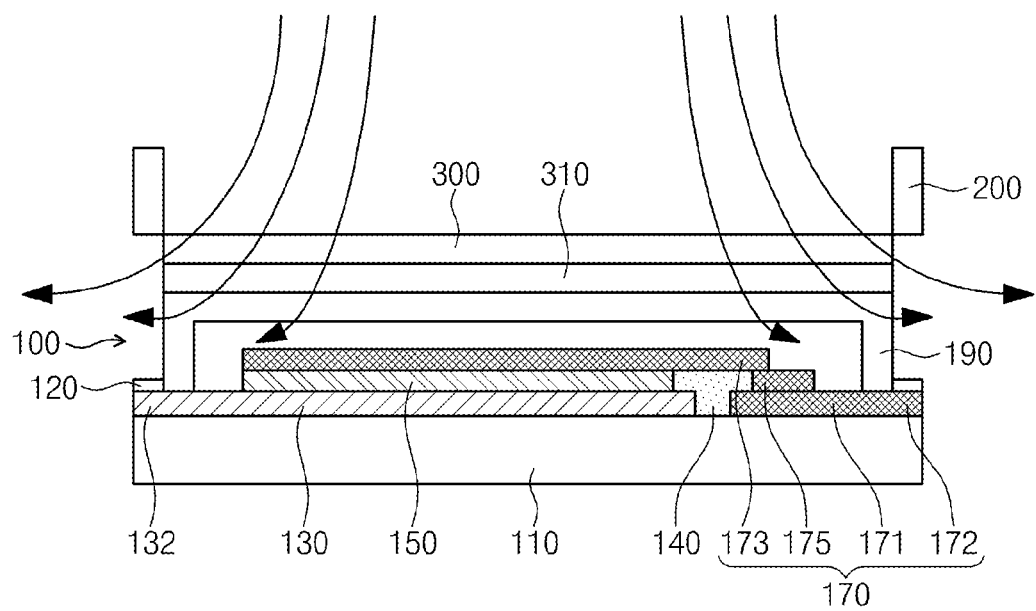
FIG. 7 is a cross-sectional view of a light source device according to another embodiment of the inventive concept.

FIG. 6 is a schematic diagram of a light source apparatus according to another embodiment of the inventive concept. Referring to FIG. 6, a portion of the outer periphery of a closed looped formed by an antenna 200 is bounded between three sides of a light emitting unit 100 to exhibit a C-shape. Thus, an inner space formed at the inner periphery of the closed loop also exhibits a C-shape and the entire inner space is open to the light emitting unit 100. Through the shape of the antenna 200, it could be confirmed that a shielding phenomenon rarely occurs.

The antenna 200 may comprise one or both of a micro strop antenna and a coil.

A driving unit 300 processes wireless power received from the antenna 200 and supplies the processed wireless power to the light emitting unit 100. The light emitting unit 100 requires suitable power to be normally driven. However, characteristics of the wireless power make it difficult to directly supply rated power. For this reason, there is a need for converting wireless power received from a rectifier circuit, a charging unit, a regulator, etc. to rated power required for a load. A component for converting wireless power to rated power required for a load, i.e., the light emitting unit 100 is a driving unit 300.

The driving unit 300 may be stacked on the light emitting unit 100 to reduce the overall volume of the light source apparatus.

In this case, a ferrite layer 310 may be provided between the driving unit 300 and the light emitting unit 100 to prevent a shielding phenomenon caused by the light emitting unit 100 or the driving unit 100.

As described so far, a light source apparatus according to the inventive concept includes an antenna that is disposed along the outer periphery so as not to encroach on a light emitting area. Thus, miniaturization can be accomplished and a shielding phenomenon of an antenna reception signal caused by the light emitting area can be suppressed. As a result, a small-sized and reliable wireless light source apparatus can be provided.

INDUSTRIAL APPLICABILITY

The inventive concept may be applied to a light source apparatus driven by wireless power.

The light source apparatus may be used as a light source of various types of light emitting apparatuses such as lighting fixtures.

While the inventive concept has been particularly shown and described with reference to exemplary embodiments thereof, it will be apparent to those of ordinary skill in the art that various changes in form and detail may be made therein without departing from the spirit and scope of the inventive concept as defined by the following claims.

What is claimed is:

1. A light source apparatus, comprising:
   a light emitting unit including a housing covering an entire light emitting area;
   an antenna disposed on an outer periphery of the light emitting area, and being configured to form a closed loop, wherein a side surface of the antenna is in face-to-face contact with a side surface of the housing, and the antenna and the housing do not overlap in a plan view of the light source apparatus; and
   a driving unit configured to process wireless power received from the antenna and to supply the processed wireless power to the light emitting unit.

2. The light source apparatus as set forth in claim 1, wherein the light emitting unit includes an organic light emitting diode (OLED) that has a transparent substrate, an anode layer, an organic thin film, and a cathode layer sequentially stacked, and
   wherein the cathode layer includes a first cathode layer disposed at the same level as the anode layer and electrically separated from the anode layer, a second cathode layer stacked on the organic thin film and protruding to a side of the first cathode layer from the organic thin film, and a third cathode layer disposed between the protruding portion of the second cathode layer and the first cathode layer to electrically connect the first and second cathode layers to each other.

3. The light source apparatus as set forth in claim 2, wherein an insulating layer is provided between the anode layer and the first cathode layer.

4. The light source apparatus as set forth in claim 2, wherein the housing covers the anode layer, the organic thin film, and the cathode layer,
   wherein a portion of one end of the anode layer and that of one end of the first cathode layer are disposed to intersect a bonding surface of the housing, and
   wherein the driving unit is connected to an outer portion of the anode layer intersecting the bonding surface of the housing and an outer portion of the first cathode layer intersecting the bonding surface of the housing.

5. The light source apparatus as set forth in claim 1, wherein the antenna includes one or both of a micro strip antenna and a coil.

6. The light source apparatus as set forth in claim 1, wherein the driving unit is stacked on the light emitting unit.

7. The light source apparatus as set forth in claim 6, further comprising a ferrite layer between the driving unit and the light emitting unit.

8. The light source apparatus of claim 1, wherein the loop-shaped antenna encloses the housing, and is in contact with an entire outer side surface of the housing.

* * * * *